United States Patent
Wang et al.

(10) Patent No.: US 12,028,811 B2
(45) Date of Patent: Jul. 2, 2024

(54) METHOD AND APPARATUS FOR CONTROLLING POWER CONSUMPTION OF TERMINAL, AND STORAGE MEDIUM

(71) Applicant: GUANGDONG OPPO MOBILE TELECOMMUNICATIONS CORP., LTD., Guangdong (CN)

(72) Inventors: Yan Wang, Guangdong (CN); Zhi Wang, Guangdong (CN); Kai Tang, Guangdong (CN); Yang Xia, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 390 days.

(21) Appl. No.: 17/510,354

(22) Filed: Oct. 25, 2021

(65) Prior Publication Data

US 2022/0046546 A1 Feb. 10, 2022

Related U.S. Application Data

(63) Continuation of application No. PCT/CN2020/086150, filed on Apr. 22, 2020.

(30) Foreign Application Priority Data

May 16, 2019 (CN) .......................... 201910405971.7
Sep. 16, 2019 (CN) .......................... 201910870118.2

(51) Int. Cl.
*H04W 74/0816* (2024.01)
*H04L 1/00* (2006.01)
(Continued)

(52) U.S. Cl.
CPC ....... *H04W 52/0258* (2013.01); *H04L 1/0002* (2013.01); *H04L 5/0055* (2013.01);
(Continued)

(58) Field of Classification Search
CPC . H04W 76/15; H04W 36/0069; H04W 24/10; H04W 76/30; H04W 76/16; H04W 76/19; H04W 76/27
See application file for complete search history.

(56) References Cited

U.S. PATENT DOCUMENTS

| 9,414,298 B1 | 8/2016 | Pasupuleti et al. |
| 2014/0128075 A1 | 5/2014 | Da Silva et al. |

(Continued)

FOREIGN PATENT DOCUMENTS

| CN | 1507753 A | 6/2004 |
| CN | 101461264 A | 6/2009 |

(Continued)

OTHER PUBLICATIONS

Chinese First office action with English Translation for CN Application No. 201910870118.2 mailed Dec. 12, 2020 (26 pages).

(Continued)

*Primary Examiner* — Khalid W Shaheed
(74) *Attorney, Agent, or Firm* — Young Basile Hanlon & MacFarlane, P.C.

(57) ABSTRACT

Described are a method and apparatus for controlling the power consumption of a terminal, and a storage medium. The method includes: recording the number of times a connection between a terminal and an auxiliary cell group fails, and where the number of times is greater than a preset threshold value, controlling, on the basis of a power consumption adjustment policy, the terminal to disable a dual-connection mode, wherein the terminal can support the dual-connection mode, and in the dual-connection mode, the terminal communicates with both a first base station and a second base station, the second base station being an auxiliary base station, and the auxiliary cell group being a group of serving cells associated with the auxiliary base station.

11 Claims, 5 Drawing Sheets

(51) Int. Cl.

| | | |
|---|---|---|
| *H04L 5/00* | (2006.01) | |
| *H04W 24/08* | (2009.01) | |
| *H04W 24/10* | (2009.01) | |
| *H04W 28/02* | (2009.01) | |
| *H04W 28/086* | (2023.01) | |
| *H04W 36/00* | (2009.01) | |
| *H04W 36/30* | (2009.01) | |
| *H04W 48/02* | (2009.01) | |
| *H04W 48/20* | (2009.01) | |
| *H04W 52/02* | (2009.01) | |
| *H04W 60/00* | (2009.01) | |
| *H04W 60/04* | (2009.01) | |
| *H04W 76/15* | (2018.01) | |
| *H04W 76/18* | (2018.01) | |
| *H04W 76/19* | (2018.01) | |
| *H04W 76/20* | (2018.01) | |
| *H04W 76/30* | (2018.01) | |
| *H04W 76/34* | (2018.01) | |
| *H04W 84/02* | (2009.01) | |
| *H04W 88/06* | (2009.01) | |
| *H04W 88/08* | (2009.01) | |
| *H04W 92/02* | (2009.01) | |
| *H04W 92/10* | (2009.01) | |

(52) U.S. Cl.
CPC ........... *H04W 24/08* (2013.01); *H04W 24/10* (2013.01); *H04W 28/0278* (2013.01); *H04W 28/0865* (2023.05); *H04W 36/0069* (2018.08); *H04W 36/00698* (2023.05); *H04W 36/0085* (2018.08); *H04W 36/305* (2018.08); *H04W 48/02* (2013.01); *H04W 48/20* (2013.01); *H04W 52/0212* (2013.01); *H04W 52/0261* (2013.01); *H04W 52/028* (2013.01); *H04W 60/005* (2013.01); *H04W 60/04* (2013.01); *H04W 76/15* (2018.02); *H04W 76/18* (2018.02); *H04W 76/19* (2018.02); *H04W 76/20* (2018.02); *H04W 76/30* (2018.02); *H04W 76/34* (2018.02); *H04W 84/02* (2013.01); *H04W 88/06* (2013.01); *H04W 88/08* (2013.01); *H04W 92/02* (2013.01); *H04W 92/10* (2013.01); *Y02D 30/70* (2020.08)

(56) References Cited

U.S. PATENT DOCUMENTS

| | | |
|---|---|---|
| 2015/0045035 A1 | 2/2015 | Nigam et al. |
| 2016/0345192 A1 | 11/2016 | Garg et al. |
| 2016/0345251 A1 | 11/2016 | Islam et al. |
| 2017/0164281 A1 | 6/2017 | Chiba et al. |
| 2021/0028976 A1* | 1/2021 | Jia ........................ H04L 41/0681 |
| 2021/0329723 A1* | 10/2021 | Teyeb .................. H04W 12/106 |

FOREIGN PATENT DOCUMENTS

| | | |
|---|---|---|
| CN | 102202421 A | 9/2011 |
| CN | 102907163 A | 1/2013 |
| CN | 103179601 A | 6/2013 |
| CN | 104247553 A | 12/2014 |
| CN | 104333890 A | 2/2015 |
| CN | 104468029 A | 3/2015 |
| CN | 104936223 A | 9/2015 |
| CN | 105122863 A | 12/2015 |
| CN | 105142238 A | 12/2015 |
| CN | 106550490 A | 3/2017 |
| CN | 107046701 A | 8/2017 |
| CN | 107682909 A | 2/2018 |
| CN | 108476382 A | 8/2018 |
| CN | 101267240 A | 9/2018 |
| CN | 108632902 A | 10/2018 |
| CN | 108810962 A | 11/2018 |
| CN | 108882327 A | 11/2018 |
| CN | 109587757 A | 4/2019 |
| CN | 110557778 A | 12/2019 |
| EP | 2704485 A4 | 7/2014 |
| EP | 3048748 A1 | 7/2016 |
| EP | 3116269 A1 | 1/2017 |
| EP | 3331192 A1 | 6/2018 |
| EP | 3606223 A1 | 2/2020 |
| WO | 2018125686 A2 | 7/2018 |
| WO | 2018174038 A1 | 9/2018 |

OTHER PUBLICATIONS

Chinese second office action with English Translation for CN Application No. 201910870118.2 mailed Feb. 22, 2021 (16 pages).
Notification to Grant Patent Right with English Translation for CN Application No. 201910870118.2 mailed May 7, 2021 (6 pages).
International search report with English Translation for PCT/CN2020/086150 mailed Jul. 21, 2020 (15 pages).
3GPP TSG RAN WG1 Meeting #77 R1-142069; Seoul, Korea, May 19-23, 2014 Dynamic Power allocation for power limited UE in dual-connectivity.
Extended European Search Report for EP Application 20806210.9 mailed Mar. 23, 2022. (12 pages).
Extended European Search Report for EP Application 20806210.9 mailed Jul. 14, 2023. (6 pages).

* cited by examiner

FIG. 1 recording the number of times of fail connections between the terminal and a secondary cell group — 201 in response to the number of times being greater than a preset threshold value, controlling, on the basis of a power consumption adjustment policy, the terminal to disable a dual connection mode — 202

METHOD AND APPARATUS FOR CONTROLLING POWER CONSUMPTION OF TERMINAL, AND STORAGE MEDIUM

CROSS-REFERENCE TO RELATED APPLICATION(S)

The present application is a continuation-application of International (PCT) Patent Application No. PCT/CN2020/086150 filed on Apr. 22, 2020, which claims priorities of Chinese Patent Application No. 201910405971.7, filed on May 16, 2019 and Chinese Patent Application No. 201910870118.2, filed on Sep. 16, 2019, the entire contents of which are hereby incorporated by reference.

TECHNICAL FIELD

The present application relates to the field of wireless technology, and in particular, to a method for controlling power consumption of a terminal, an apparatus, and a storage medium.

BACKGROUND

5th Generation (5G) mobile communication systems support Standalone (SA) architectures and Non-Standalone (NSA) architectures, a kind of typical NSA architecture is a Dual Connection (DC) architecture.

In the DC architecture, a terminal can work in a dual connection mode. In the dual connection mode, the terminal communicates with both two base stations, for example, the terminal communicates with both a Long Term Evolution (LTE) base station and a New Radio (NR) base station, which results in large power consumption of the terminal.

SUMMARY

An embodiment of the present application provides a method for controlling power consumption of a terminal, the method comprises: recording number of times of fail connections between a terminal and a secondary cell group (SCG); in response to the number of times being greater than a preset disabling threshold, controlling, the terminal to disable a dual connection mode based on a power consumption adjustment policy; wherein the terminal is configured to communicate with a first base station and a second base station in the dual-connection mode; the second base station is an auxiliary base station, and the SCG is a group of serving cells associated with the auxiliary base station.

An embodiment of the present application provides an apparatus for controlling power consumption of a terminal, comprising a memory, a processor, and a computer program stored in the memory and being executable in the processor; wherein the processor, when executing the program, implements operations of the above method.

An embodiment of the present application provides a non-transitory computer storage medium, which stores computer instructions, wherein the instructions, when being executed by a processor, implements operations of the above method.

DETAILED DESCRIPTION

Figure 1:
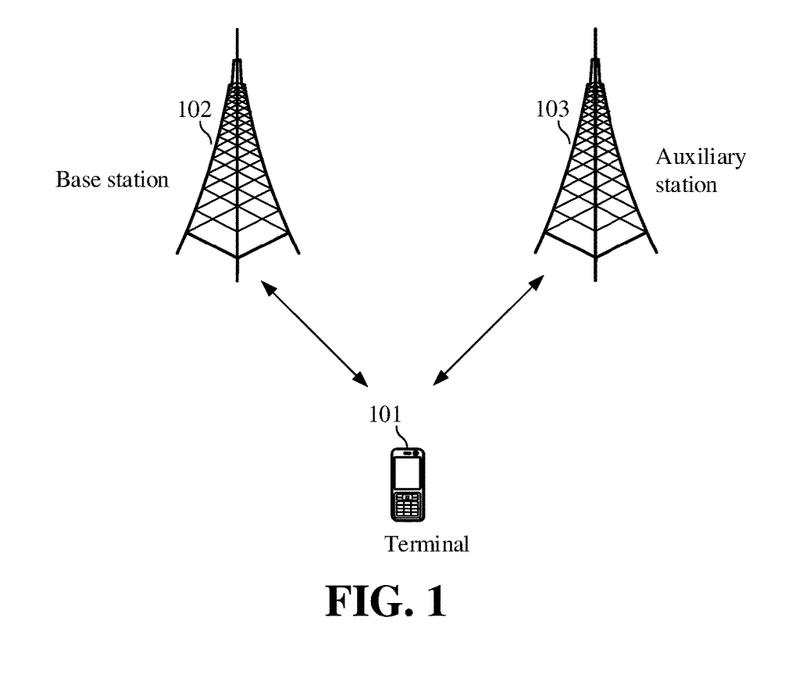
FIG. 1 is a structural schematic diagram of a system for applying a method for controlling power consumption of a terminal according to an embodiment of the present application.

FIG. 1 is a structural schematic diagram of a system for applying a method for controlling power consumption of a terminal according to an embodiment of the present application. As shown in FIG. 1, the system includes a terminal 101, a main base station 102, and an auxiliary base station 103.

The terminal 101 can establish a radio connection with the main base station 102 (also referred to as "main node"), so as to realize communication with the main base station 102; the terminal 101 can also establish a radio connection with the auxiliary base station 103 (also referred to as "auxiliary node"), so as to realize communication with the auxiliary base station 103; the terminal 101 can also establish a radio connection with both the main base station 102 and the auxiliary base station 103, so as to realize communication with both the main base station 102 and the auxiliary base station 103.

The terminal 101 establishes two connections with both the main base station 102 and the auxiliary base station 103 in a dual connection mode, wherein the main base station 102 is mainly responsible for transmitting signaling, and the auxiliary base station 103 is responsible for transmitting data. Technical solutions of embodiments of the present application mainly aim at terminals in dual connection modes.

Types of the main base station 102 and the auxiliary base station 103 shown in FIG. 1 can be identical and can also be different. In one embodiment, the main base station 102 is an LTE base station, and the auxiliary base station 103 is an NR base station. In another embodiment, the main base station 102 is an NR base station, and the auxiliary base station 103 is also an NR base station. In one embodiment, the main base station 102 is an NR base station, and the auxiliary base station 103 is an LTE base station. Embodiments of the present application do not limit the types of the main base station 102 and the auxiliary base station 103.

In one embodiment, the dual connection mode is an EN-DC mode or a next generation EN-DC (NG EN-DC)

mode; in this case, the main base station 102 is an LTE base station, the auxiliary base station 103 is an NR base station, and the terminal communicates with both the LTE base station and the NR base station.

In another embodiment, the dual connection mode is an NR-EUTRA (NE-DC) mode; in this case, the main base station 102 is an NR base station, the auxiliary base station 103 is an LTE base station, and the terminal communicates with both the LTE base station and the NR base station.

It should be noted that the dual connection mode is not limited to the above EN-DC mode and NE-DC mode. Embodiments of the present application do not limit specific types of the dual connection mode.

In specific implementation, an arrangement manner of the main base station and the auxiliary base station can be co-base station arrangement (for example, an NR base station and an LTE base station can be disposed on the same physical device), and can also be non-co-base station arrangement (for example, an NR base station and an LTE base station can be disposed on different physical devices), the present application may not limit here. Herein, an LTE base station can also be referred to as an envolved Node B (eNB), and an NR base station can also be referred to as a next generation node B (gNB). It should be noted that the present application may not limit mutual relationships between covering ranges of the main base station and of the auxiliary base station, for example, the main base station and the auxiliary base station can cover overlappingly.

The present application may not limit specific types of the terminal 101, which can be any user device supporting the aforementioned dual connection mode, for example, can be a smart phone, a personal computer, a notebook computer, a tablet computer, a portable wearable device, etc.

A scene for applying embodiments of the present application may be as follows: in a 5G NSA, when the number of times of fail connections between the terminal and a secondary cell group (SCG) is greater than a preset threshold value in a preset time period, if the terminal still maintains dual connection with the main base station and the auxiliary base station, regarding the terminal, not only may communication with the main base station result in power consumption, but also communication with the auxiliary base station may result power consumption; thus, power consumption of the terminal will increase. Therefore, in the case that the number of times of fail connections between the terminal and a SCG is greater than a preset threshold value in a preset time period, it is possible to disconnect the connection with the auxiliary base station or not to connect with the auxiliary base station, so as to keeps being in a mono connection mode and further lower power consumption of the terminal.

Figure 2:
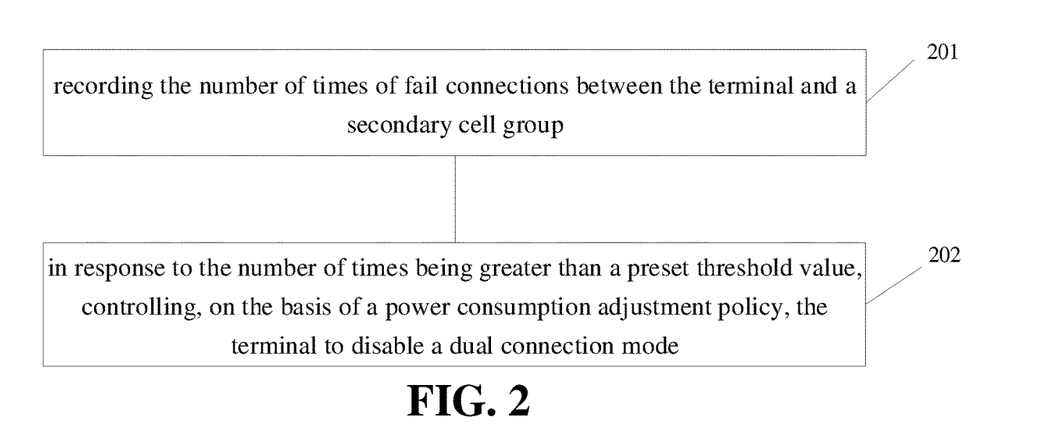
FIG. 2 is a schematic diagram of a flow of a method for controlling power consumption of a terminal according to an embodiment of the present application.

FIG. 2 is a schematic diagram of an implementing flow of a method for controlling power consumption of a terminal according to an embodiment of the present application. As shown in FIG. 2, the method comprises the follows.

Operation 201: the number of times of fail connections between a terminal and a SCG in a preset time period is recorded.

Here, the terminal can support a dual connection mode; in the dual connection mode, the terminal communicates with both a first base station and a second base station; the second base station is an auxiliary base station; the SCG is a group of serving cells associated with the auxiliary base station.

Here, in order to realize communication with both the two base stations, the terminal needs to have two sets of communication modules, and the two sets of communication modules correspond to the two base stations respectively.

Wherein, a first modulator-demodulator (modem) and a first radio frequency path (including a first radio frequency circuit and a first radio frequency antenna) form a first set of communication modules, the first set of communication module corresponds to the first base station; a second modulator-demodulator (modem) and a second radio frequency path (including a second radio frequency circuit and a second radio frequency antenna) form a second set of communication modules, the second set of communication module corresponds to the second base station. In one embodiment, the first modem is a 5G modem, the second modem is a 4G modem, the first radio frequency circuit is a 5G RF, and the second radio frequency circuit is a 4G RF. In the dual connection mode, the first communication module and the second communication module work at the same time.

In actual application, in order to avoid that the terminal still works in the dual connection mode which causes the power consumption of the terminal to increase sharply in the situation that the terminal fails to connect to the SCG for many times within the preset time period, the terminal may be provided with a virtual switch. When a user turns on the virtual switch through a touch operation, the terminal determines that it needs to optimize its own power consumption, and starts to monitor the number of times of fail connections between the terminal and the SCG within a preset time period.

Based on this, in one embodiment, recording the number of times of fail connections between the terminal and the SCG within a preset time period includes: determining whether a first instruction is received, wherein the first instruction is configured to instruct the terminal to optimal its own power consumption; when it is determined that the first instruction is received, recording the number of times of fail connections between the terminal and the SCG within a preset time period.

Figure 3:
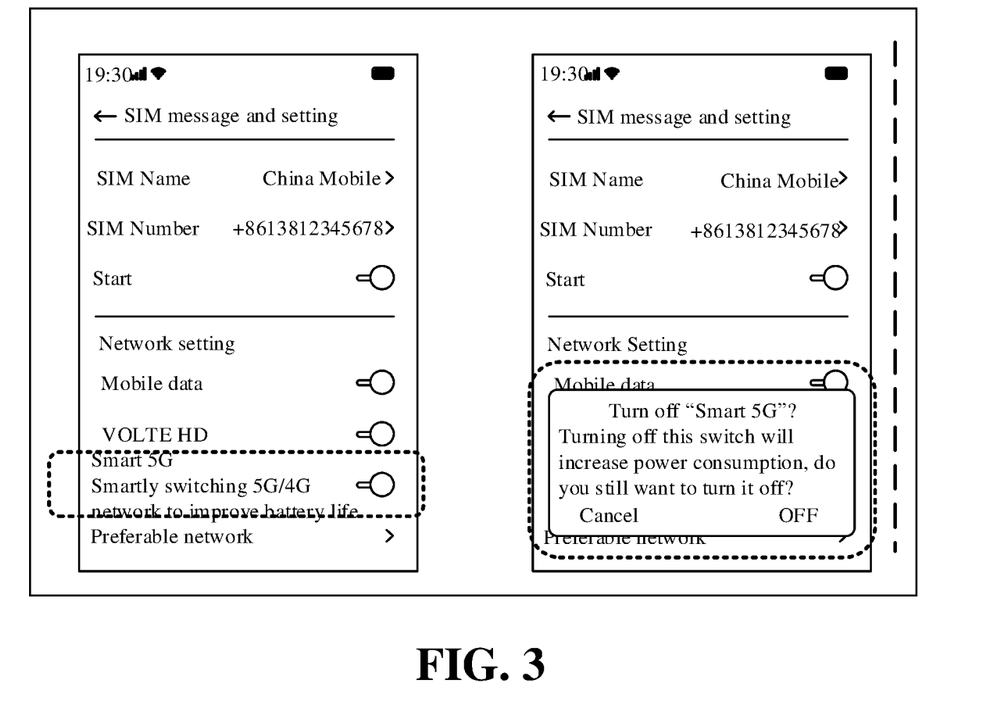
FIG. 3 is a schematic diagram of a virtual switch set in a terminal according to an embodiment of the present application.

For example, as shown in FIG. 3, the terminal can be provided thereon with a virtual switch, such as "smart 5G"; when a user turns on the virtual switch through a touch operation, the first instruction can be generated in response to the touch operation and received by a processor or the like of the terminal, and thus the terminal determines that it needs to optimize its own power consumption based on the first instruction, and starts to monitor the number of times of fail connections between the terminal and the SCG within a preset time period; when a user turns off the virtual switch through a touch operation, the terminal can generate a prompt message, such as "turning off the switch will increase mobile phone power consumption, whether to turn off or not", and determine whether a confirmation operation in response to the prompt message is received; when it is determined that the confirmation operation is received, the terminal determines that it is not required to optimize its own power consumption.

In one embodiment, after receiving the first instruction, the recording the number of times of fail connections between the terminal and the SCG within a preset time period includes: determining whether a state of a screen of the terminal is a screen-on state; when it is determined that the state of the screen of the terminal is the screen-on state and the terminal fails to connect with the SCG once, recording the number of times of fail connections between the terminal and the SCG within a preset time period.

Operation 202: in response to the number of times being greater than a preset threshold value, on the basis of a power consumption adjustment policy, the terminal is controlled to disable a dual-connection mode.

Specifically, it is possible to determine whether the number of times is greater than a preset threshold value; when it is determined that the number of times is greater than the preset threshold value, on the basis of a power consumption adjustment policy, the terminal is controlled to disable a dual-connection mode.

Here, the power consumption adjustment policy can mean policies that can prevent the terminal from activating a dual connection mode; and can also mean policies that can lower probability for the terminal to activate a dual connection mode. Specifically, the following two types can be included.

A first type of power consumption adjustment policy: if a current mode of the terminal is a mono connection mode, when a measurement request sent from the first base station is received, the terminal may not respond the measurement request, or not report a measurement report of the auxiliary base station, so as to avoid the network device from setting a dual connection mode, thereby avoid the terminal from activating a dual connection mode, and finally control the terminal to switch from a dual connection mode to a mono connection mode. Wherein, the mono connection mode can mean that the terminal establishes connection with the first base station.

A second type of power consumption adjustment policy: if a current mode of the terminal is a dual connection mode, the terminal can send an SCG failure message to the first base station, so as to avoid the first base station from setting a dual connection mode, thereby avoid the terminal from activating a dual connection mode, and finally control the terminal to switch from a dual connection mode to a mono connection mode.

It should be noted that, here, when it is determined that the state of the screen of the terminal is the screen-on state and the terminal fails to connect with the SCG once, the number of times of fail connections between the terminal and the SCG within a preset time period is recorded. In a preset time period after determining that the number of times is greater than a preset threshold value, it is possible to control the terminal to disable a dual connection mode based on a power consumption adjustment policy; after the preset time period elapses, terminal can control the terminal to enable a dual connection mode based on a power consumption adjustment policy.

In actual application, when a measurement request sent from the first base station is received, if a current mode of the terminal is a mono connection mode, the terminal can use the first type of power consumption adjustment policy and do not respond the measurement request, so as to avoid the network device from setting a dual connection mode, thereby avoid the terminal from activating a dual connection mode, and finally control the terminal to switch from a dual connection mode to a mono connection mode.

Based on this, in one embodiment, based on a power consumption adjustment policy, controlling the terminal to switch from a dual connection mode to a mono connection mode includes: when a measurement request sent from the first base station is received in a first time period, not responding the measurement request; the measurement request is configured to indicate the terminal to measure the second base station.

Here, in the case that the number of times is greater than a preset threshold value, it is possible to start a timer and determine whether a measurement request sent from the first base station is received in the first time period. When a measurement request sent from the first base station is received, the measurement request is not responded. In actual application, for an EN-DC mode, the measurement request can specifically be an event with a number B 1 that the network device equips an LTE to an NR for the terminal.

Here, the not responding the measurement request can mean that the terminal, after receiving the measurement request, does not measure the auxiliary base station according to the measurement request.

For example, the terminal, after receiving the measurement request, can discard the measurement request, that is, does not store the measurement request.

It should be noted that, here, since the terminal does not respond the measurement request, the terminal will not measure the auxiliary base station, and thus cannot obtain any measurement report of the second base station. Thus, the terminal will not send any measurement report of the auxiliary base station to the network device, the network device cannot set a dual connection mode according to a measurement report of the auxiliary base station reported by the terminal, such that the terminal works in a mono connection mode, thereby making the terminal actively select not communicating with any auxiliary base station in NSA. Compared with the manner in the prior art that a terminal needs to communicate with both a main base station and an auxiliary base station, electric power consumed by the terminal communicating with two base stations can be reduced, and thus a standby time period of the terminal is improved.

In actual application, when a measurement request sent from the first base station is received, if a current mode of the terminal is a mono connection mode, the terminal can use the first type of power consumption adjustment policy and do not report any measurement report of the auxiliary base station, so as to avoid the network device from setting a dual connection mode, thereby avoid the terminal from activating a dual connection mode, and finally control the terminal to switch from a dual connection mode to a mono connection mode.

Based on this, in one embodiment, based on a power consumption adjustment policy, controlling the terminal to switch from a dual connection mode to a mono connection mode includes: receiving a measurement request sent from the first base station, wherein the measurement request is configured to indicate the terminal to measure an auxiliary base station in a network device; according to the measurement request, measuring the auxiliary base station to obtain a measurement report of the auxiliary base station; sending a measurement report to the first base station, wherein the measurement report does not include the measurement report of the auxiliary base station.

Here, that the measurement report sent to the network device by the terminal does not include the measurement report of the auxiliary base station can mean that the terminal does not send the measurement report of the auxiliary base station to the network device.

For example, after measuring the auxiliary base station and obtaining a measurement report of the auxiliary base station, the terminal discards the measurement report of the auxiliary base station, that is, does not store the measurement report of the auxiliary base station.

It should be noted that, here, although the terminal measures the auxiliary base station according to the measurement request, when the terminal sends a measurement report to the network device, no measurement report of the auxiliary base station is sent to the network device. In this way, the network device cannot set a dual connection mode according to a measurement report of the auxiliary base station reported by the terminal, such that the terminal works in a mono connection mode, thereby making the terminal actively select not communicating with any auxiliary base station in NSA. Compared with the manner in the prior art that a terminal needs to communicate with both a main base station and an auxiliary base station, electric power consumed by the terminal communicating with two base stations can be reduced, and thus a standby time period of the terminal is improved.

In actual application, if a current mode of the terminal is a dual connection mode, the terminal can use a third type of power consumption adjustment policy to avoid the network device from setting a dual connection mode, thereby avoid the terminal from activating a dual connection mode, and finally control the terminal to switch from a dual connection mode to a mono connection mode.

Base on this, in one embodiment, based on a power consumption adjustment policy, controlling the terminal to switch from a dual connection mode to a mono connection mode includes: sending an SCG failure message to the first base station, wherein the SCG failure message indicates that a dual connection fails; receiving a releasing SCG indication message; and releasing a dual connection according to the releasing SCG indication message.

Here, the SCG failure message can include a measurement report of the auxiliary base station; alternatively, an NR SCG failure message can include no measurement report of the auxiliary base station.

It should be noted that, in order to avoid the network device from setting a dual connection mode again according to a measurement report of the auxiliary base station sent from the terminal after the terminal releases a dual connection, the SCG failure message can include no measurement report of the auxiliary base station.

Here, the terminal can connect a re-configuration message through radio resource control (RRC) to receive the releasing SCG indication message sent from the first base station.

Here, after releasing a dual connection, the terminal can return to a mono connection mode from a dual connection mode, and keep being in the mono connection mode.

Here, after returning from a dual connection mode to a mono connection mode and receiving a measurement request sent from the first base station, the terminal may not respond the measurement request or not report a measurement report of the auxiliary base station, so as avoid the network device from setting a dual connection mode, thereby avoid the terminal from activating a dual connection mode, and finally control the terminal to keep being in a mono connection mode.

It should be noted that, here, the terminal sends an SCG failure message to the first base station, receives an SCG releasing indication message sent from the network device, and releases a dual connection according to the SCG releasing indication message, so as to realize returning a dual connection mode to a mono connection mode, such that the terminal actively selects not communicating with any auxiliary base station in NSA. Compared with the manner in the prior art that a terminal needs to communicate with both a main base station and an auxiliary base station, electric power consumed by the terminal communicating with two base stations can be reduced, and thus a standby time period of the terminal is improved.

In actual application, it is possible to control the terminal to switch from a dual connection mode to a mono connection mode according to a power consumption adjustment policy, and it is also possible to control the terminal to switch from a mono connection mode to a dual connection mode according to a power consumption adjustment policy.

Based on this, in one embodiment, the method further includes: in a case that the number of times is less than or equal to a preset threshold value, on the basis of the power consumption adjustment policy, controlling the terminal to enable a dual connection mode.

Here, the preset threshold values corresponding to controlling the terminal to disable a dual connection mode and controlling the terminal to enable a dual connection mode can be the same, and can also be different.

Here, a process of controlling the terminal to enable a dual connection mode on the basis of the power consumption adjustment policy is similar to a process of controlling the terminal to disable a dual connection mode, and is not repeated here.

By adopting the technical solution provided by this embodiment of the present application, it is possible to control the terminal to disable a dual connection mode in response to the number of times of fail connections between the terminal and the SCG in a preset time period being greater than a preset threshold value. In comparison with the method in the prior art that a terminal communicates with both a main base station and an auxiliary base station in NSA, the occurrence of the problem that the terminal works in a dual connection mode and results in too large power consumption can be avoided. Thus, power consumption of the terminal can be lowered, and standby time of the terminal is thereby increased.

A method for controlling power consumption of a terminal according to an embodiment of the present application is described in detailed below in accompany with specific embodiments.

Figure 4:
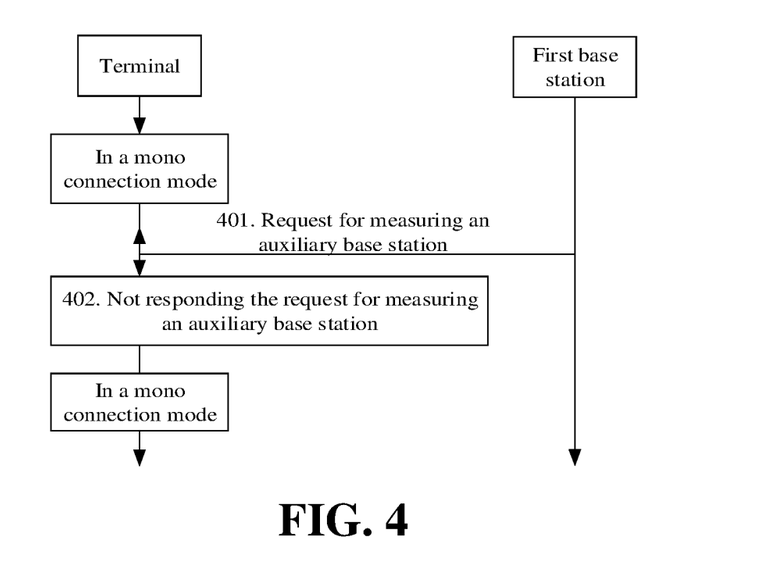
FIG. 4 is a schematic diagram of an implementation flow of a terminal according to an embodiment of the present application implementing disabling a dual connection mode by ignoring a measurement request of an auxiliary base station.

FIG. 4 is a schematic diagram of an implementation flow of a terminal according to an embodiment of the present application implementing disabling a dual connection mode by ignoring a measurement request of an auxiliary base station. The method includes the follows.

Operation 401: a first base station sends a request for measuring an auxiliary base station to a terminal.

Here, a first network is a 5G network (which can also be referred to as an NR network), a second network is a 4G network (which can also be referred to as an LTE network); the terminal is in an LTE mode (mono connection mode), and the terminal communicates with the first base station (LTE base station); the first base station is a main base station.

Operation 402: the terminal does not respond the request for measuring an auxiliary base station.

Here, when it is determined that the state of the screen of the terminal is the screen-on state and the terminal fails to connect with the SCG once, the number of times of fail connections between the terminal and the SCG within a preset time period is recorded. In a preset time period after determining that the number of times is greater than a preset threshold value, if the terminal receives the request for measuring an auxiliary base station sent from the first base station, the request for measuring an auxiliary base station is not responded.

Here, that the request for measuring an auxiliary base station is not responded can mean that the terminal, after receiving the request for measuring an auxiliary base station, does not measure a second base station according to the request for measuring an auxiliary base station.

For example, the terminal, after receiving the request for measuring an auxiliary base station, can discard the request for measuring an auxiliary base station, that is, does not store the request for measuring an auxiliary base station.

It should be noted that, here, since the terminal does not respond the request for measuring an auxiliary base station, the terminal will not measure the second base station, and thus cannot obtain any measurement report of the second base station. Therefore, the terminal will not send a measurement report of the second base station to the network device, and the network device cannot set a dual connection mode according to a measurement report of the second base station reported by the terminal, such that the terminal keeps being in a mono connection mode, thus power consumption of the terminal is saved, and standby time of the terminal is increased.

Figure 5:
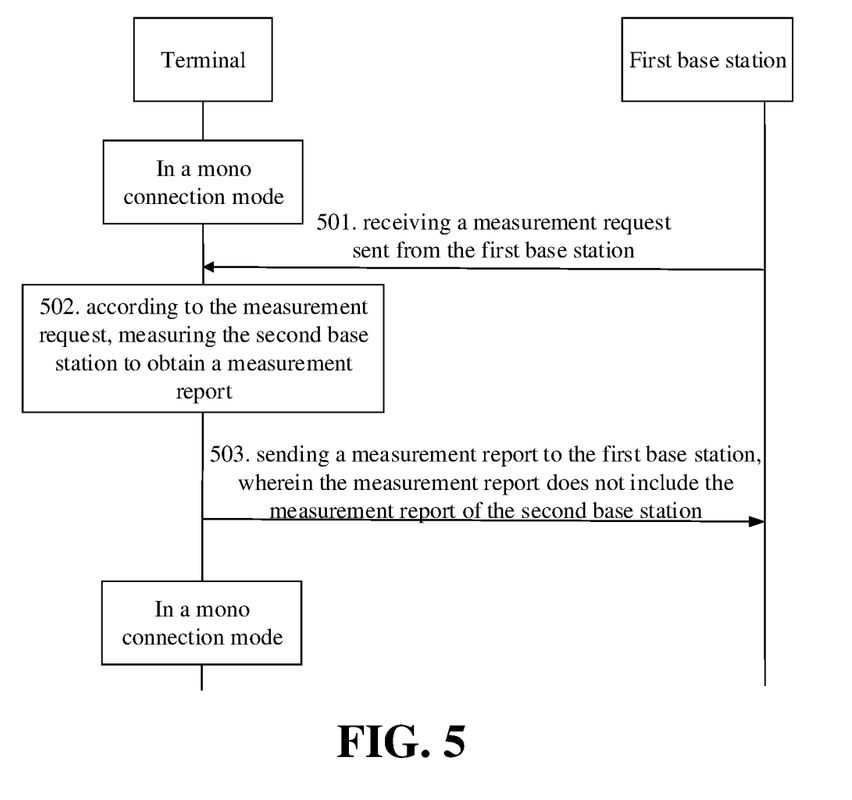
FIG. 5 is a schematic diagram of an implementation flow of a terminal according to an embodiment of the present application implementing disabling a dual connection mode by pausing reporting a measurement report of an auxiliary base station.

FIG. 5 is a schematic diagram of an implementation flow of a terminal according to an embodiment of the present application implementing disabling a dual connection mode by pausing reporting a measurement report of an auxiliary base station. The method includes the follows.

Operation 501: a first base station sends a request for measuring an auxiliary base station to a terminal.

Here, a first network is a 5G network (which can also be referred to as an NR network), a second network is a 4G network (which can also be referred to as an LTE network); the terminal is in an LTE mode (mono connection mode), and the terminal communicates with the first base station (LTE base station); the first base station is a main base station.

Operation 502: the terminal, according to the request for measuring an auxiliary base station, measures a second base station to obtain an auxiliary base station measurement report.

Operation 503: a measurement report is sent to the first base station; the measurement report does not include any measurement report of the second base station.

Here, when it is determined that the state of the screen of the terminal is the screen-on state and the terminal fails to connect with the SCG once, the number of times of fail connections between the terminal and the SCG within a preset time period is recorded. In a preset time period after determining that the number of times is greater than a preset threshold value, if the terminal receives the request for measuring an auxiliary base station sent from the first base station, it measures the second base station according to the request for measuring an auxiliary base station to obtain a measurement report of the auxiliary base station, but does not report the measurement report of the auxiliary base station.

It should be noted that, here, although the terminal measures the second base station according to the request for measuring an auxiliary base station, when the terminal sends a measurement report to a network device, no measurement report of the second base station is sent to the network device. Therefore, the network device cannot set a dual connection mode according to a measurement report of the second base station reported by the terminal, such that the terminal keeps being in a mono connection mode, thus power consumption of the terminal is saved, and standby time of the terminal is increased.

Figure 6:
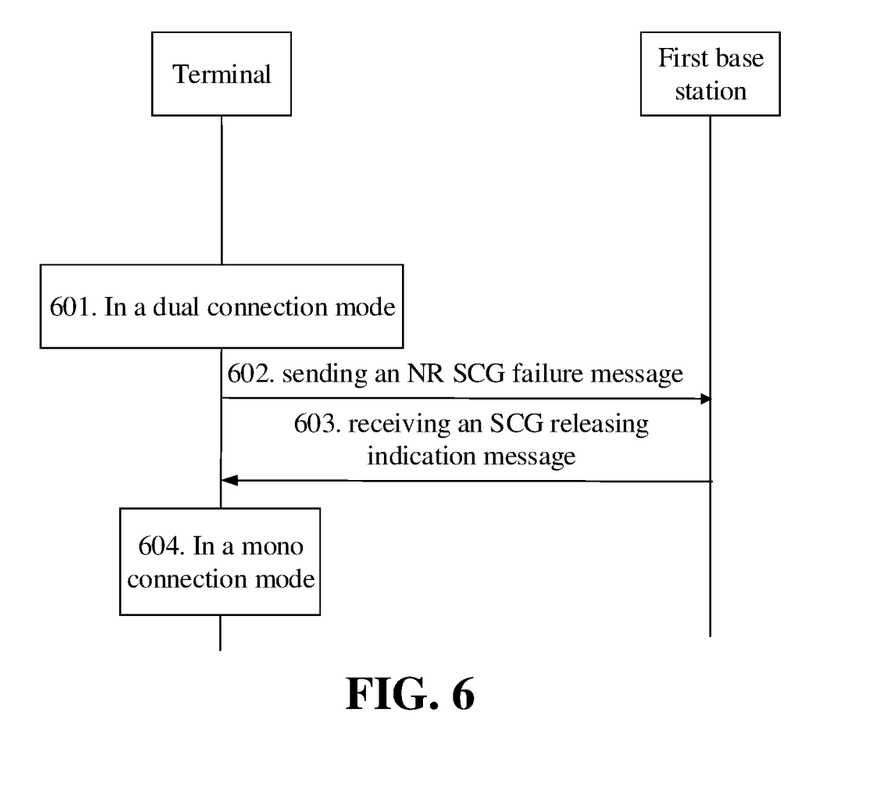
FIG. 6 is a schematic diagram of an implementation flow of a terminal according to an embodiment of the present application implementing disabling a dual connection mode by sending an SCG failure message.

FIG. 6 is a schematic diagram of an implementation flow of a terminal according to an embodiment of the present application implementing disabling a dual connection mode by sending an SCG failure message. The method includes the follows.

Operation 601, a terminal is currently in a dual connection mode.

Here, a first network is a 5G network (which can also be referred to as an NR network), a second network is a 4G network (which can also be referred to as an LTE network); the terminal is in a dual connection mode (EN-DC mode), and the terminal communicates with both a first base station (LTE base station) and a second base station (NR base station).

Operation 602: the terminal sends an NR SCG failure message to the first base station.

Operation 603: the first base station sends an SCG releasing indication message to the terminal.

Operation 604: the terminal releases a dual connection according to the releasing SCG indication message and switches into a mono connection mode.

Here, when it is determined that the state of the screen of the terminal is the screen-on state and the terminal fails to connect with the SCG once, the number of times of fail connections between the terminal and the SCG within a preset time period is recorded. In a preset time period after determining that the number of times is greater than a preset threshold value, the terminal sends an SCG failure message to the first base station, and releases a dual connection according to the releasing SCG indication message. Here, after releasing the dual connection, the terminal can return to a mono connection mode from a dual connection mode, and keep being in the mono connection mode. Here, after returning to the mono connection mode from the dual connection mode and receiving a request for measuring an auxiliary base station sent from the first base station, the terminal may not respond the request for measuring an auxiliary base station or not report any measurement report of the auxiliary base station, so as avoid the network device from setting a dual connection mode, thereby avoid the terminal from activating a dual connection mode, and finally control the terminal to keep being in a mono connection mode. It should be noted that, here, the terminal realizes returning a mono connection mode from a dual connection mode by sending an SCG failure message to a network device, receiving a releasing auxiliary cell group indication message sent according to SCG by the network device, and releasing a dual connection according to releasing auxiliary cell group indication message, such that the terminal actively selects not communicating with any auxiliary base station in NSA. Compared with the manner in the prior art that a terminal needs to communicate with both a main base station and an auxiliary base station, electric power consumed by the terminal communicating with two base stations can be reduced, and thus a standby time period of the terminal is improved.

Figure 7:
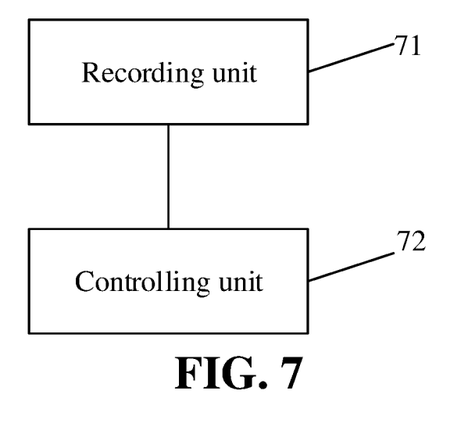
FIG. 7 is a first composed structural schematic diagram of an apparatus for controlling power consumption of a terminal according to an embodiment of the present application.

In order to realize a method for controlling power consumption of a terminal according to an embodiment of the present application, an embodiment of the present application further provides an apparatus for controlling power consumption of a terminal. FIG. 7 is a composed structural schematic diagram of an apparatus for controlling power consumption of a terminal according to an embodiment of the present application. As shown in FIG. 7, the apparatus includes: a recording unit 71 configured for recording the number of times of fail connections between a terminal and the SCG in a preset time period; and a controlling unit 72 configured for: in response to the number of times being greater than a preset threshold value, controlling, on the basis of a power consumption adjustment policy, the terminal to disable a dual connection mode; wherein the terminal can support the dual connection mode, and in the dual connection mode, the terminal communicates with both a first base station and a second base station; the second base station is an auxiliary base station.

In one embodiment, the recording unit 71 is specifically configured to: detect whether a first instruction is received;

and when it is determined that the first instruction is received, record the number of times of fail connections between the terminal and the SCG in the preset time period.

In one embodiment, the recording unit 71 is specifically configured to: after the first instruction is received, determine whether a state of a screen of the terminal is a screen-on state; when it is determined that the state of the screen of the terminal is the screen-on state and the terminal fails to connect with the SCG once, recording the number of times of fail connections between the terminal and the SCG in the preset time period.

In one embodiment, the controlling unit 72 is specifically configured to: when a measurement request sent from the first base station is received in a first time period, not respond the measurement request; wherein the measurement request is configured to indicate the terminal to measure the second base station.

In one embodiment, the controlling unit 72 is specifically configured to: receive a measurement request sent from the first base station, wherein the measurement request is configured to indicate the terminal to measure an auxiliary base station in the network device; according to the measurement request, measure the auxiliary base station to obtain a measurement report of the auxiliary base station; send a measurement report to the first base station, wherein the measurement report does not include the measurement report of the auxiliary base station.

In one embodiment, the controlling unit 72 is specifically configured to: send an SCG failure message to the first base station, wherein the SCG failure message indicates that a dual connection fails; receive a releasing SCG indication message sent from the first base station; and release a dual connection according to the releasing SCG indication message.

Here, the terminal, after releasing a dual connection, can return a mono connection mode from a dual connection mode and keep being in a mono connection mode. Here, after the terminal is able to return to a mono connection mode from a dual connection mode, when a measurement request sent from the first base station is received, the terminal may not respond the measurement request, or not report the measurement report of the auxiliary base station, so as to avoid the network device from setting a dual connection mode, thereby avoid the terminal from activating a dual connection mode, and finally control the terminal to keep being in a mono connection mode.

In one embodiment, the controlling unit 72 is further configured to: in a case that the number of times is less than or equal to a preset threshold value, on the basis of the power consumption adjustment policy, control the terminal to enable a dual connection mode.

Here, the preset threshold values corresponding to controlling the terminal to disable a dual connection mode and controlling the terminal to enable a dual connection mode can be the same, and can also be different. Here, a process of controlling the terminal to enable a dual connection mode on the basis of the power consumption adjustment policy is similar to a process of controlling the terminal to disable a dual connection mode, and is not repeated here.

In actual application, the recording unit 71 and the controlling unit 72 can be implemented by a processor of the apparatus for controlling power consumption of a terminal.

It needs be noted that, when the apparatus for controlling power consumption of a terminal provided by the above embodiment performs control, only the division of the above-mentioned program modules is used as an example for illustration. In actual application, it is possible to allocate the above-mentioned processing to different program modules to complete according to requirements. That is, the internal structure of the apparatus is divided into different program modules to complete all or part of the processing as described above. In addition, the apparatus for controlling power consumption of a terminal and the method for controlling power consumption of a terminal provided by the above embodiments belong to the same concept. For the specific implementation process, please refer to the method embodiment, which will not be repeated here.

Figure 8:
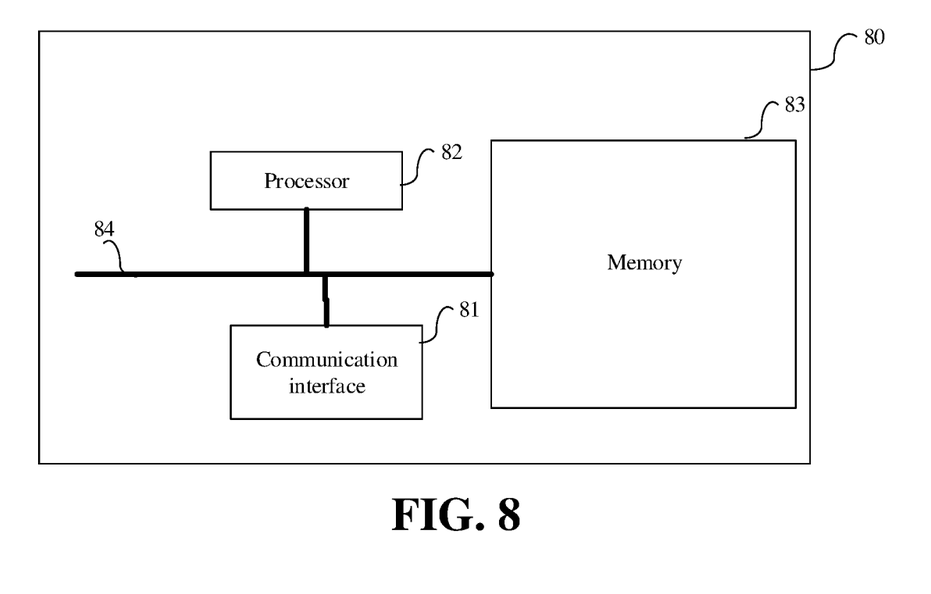
FIG. 8 is a first composed structural schematic diagram of an apparatus for controlling power consumption of a terminal according to an embodiment of the present application.

An embodiment of the present application further provides an apparatus for controlling power consumption of a terminal, as shown in FIG. 8, the apparatus 80 includes a communication interface 81, a processor 82, and a memory 83; wherein the communication interface 81 is capable of performing information exchange with other devices, the processor 82 is connected with the communication interface 81 and configured to execute a method provided by one or more technical solutions in the above smart device side when running a computer program. The computer program is stored in the memory 83.

Of course, in actual application, various components in the apparatus 80 are coupled together via a bus system 84. It can be understood that the bus system 84 is configured to implement connection and communication among these components. Besides a data bus, the bus system 84 further includes a power supply bus, a control bus, and a state signal bus. However, for clear illustration, various buses are all marked as the bus system 84 in FIG. 8.

The memory 83 in this embodiment of the present application is configured to store various types of data to support operations of the apparatus 80. Examples of the data include any computer program configured to operate on the apparatus 80.

The method disclosed by the above embodiment of the present application may be applied in the processor 82 or implemented by the processor 82. The processor 82 may be an integrated circuit chip with signal processing capability. In an implementation process, the steps of the above method can be completed by an integrated logic circuit of hardware in the processor 82 or instructions in the form of software. The aforementioned processor 82 may be a general-purpose processor, a digital signal processor (DSP), or other programmable logic devices, discrete gate or transistor logic devices, discrete hardware components, or the like. The processor 82 can implement or execute various methods, steps, and logical block diagrams disclosed in embodiments of the present application. The general-purpose processor may be a microprocessor or any conventional processor or the like. In combination with steps of methods disclosed in embodiments of the present application, it may be directly embodied as being executed and completed by a hardware decoding processor, or executed and completed by a combination of hardware and software modules in a decoding processor. The software module may be located in a storage medium, and the storage medium is located in the memory 83. The processor 82 reads information in the memory 83 and completes the steps of the foregoing method in combination with its hardware.

In an exemplary embodiment, the apparatus 80 may be implemented by one or more application specific integrated circuits (ASIC), DSP, programmable logic device (PLD), complex programmable logic device (CPLD), field-programmable gate array (FPGA), general-purpose processor, controller, microcontroller (MCU), microprocessor, or other electronic components, and is configured to perform the aforementioned method.

It can be understood that the memory 83 in this embodiment of the present application may be a volatile memory or a non-volatile memory, and may also include both volatile and non-volatile memories. Among them, the non-volatile memory can be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disc, or a compact disc read-only memory (CD-ROM). The magnetic surface memory can be a magnetic disk memory or a tape memory. The volatile memory may be a random access memory (RAM), which is used as an external cache. By way of exemplary but not restrictive description, many forms of RAM are available, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a syncLink dynamic random access memory (SLDRAM), and a direct Rambus random access memory (DRRAM). Memories described in embodiments of the present application are intended to include, but are not limited to, these and any other suitable types of memories.

It should be noted that: "first", "second", and the like are used to distinguish similar objects, but are not necessarily used to describe a specific sequence or order.

In these embodiments provided by the present application, it should be understood that the disclosed devices and methods may be implemented in other ways. The device embodiments described above are merely illustrative, for example, the division of the units is only a logical function division, and there may be other divisions in actual implementation, for example, multiple units or components can be combined, or can be integrated into another system, or some features can be ignored or not implemented. In addition, coupling, direct coupling, or communication connection among various components which are shown or discussed may be indirect coupling or communication connection through some interfaces, devices or units, and may be in electrical, mechanical, or other forms.

The above units described as discrete components may be or may not be physically separated, and the components displayed as units may be or may not be physical units, that is, they may be located in one place, and can also be distributed on multiple network units; some or all of the units can be selected according to actual needs to achieve the purpose of the solution of this embodiment.

In addition, functional units in embodiments of the present application can be all integrated into one processing module, or each unit can be individually used as a unit, or two or more units can be integrated in one unit; the above-mentioned integrated unit can be implemented in the form of hardware, and can also be implemented in the form of hardware with software functional units. Those of ordinary skill in the art can understand that implementation of all or some of the steps of the above method embodiments can be completed by a program instructing relevant hardware. The foregoing program can be stored in a computer readable storage medium, and when the program is executed, steps including the foregoing method embodiments are executed; and the foregoing storage medium includes various media that can store program codes a mobile storage device, an ROM, an RAM, a magnetic disk, an optical disk, etc.

The methods disclosed in these method embodiments provided by the present application can be combined arbitrarily without conflict to obtain new method embodiments.

The features disclosed in these product embodiments provided by the present application can be combined arbitrarily without conflict to obtain new product embodiments.

The features disclosed in these method or device embodiments provided by the present application can be combined arbitrarily without conflict to obtain new method embodiments or device embodiments.

The above described are only specific embodiments of the present application, but the protection scope of the present application is not limited thereto. Any change or replacement that can be easily considered by those skilled in the art within the technical scope disclosed by the present application should be covered within the protection scope of the present application. Therefore, the protection scope of the present application should be subject to the protection scope of the claims.

What is claimed is:

1. A method for controlling power consumption of a terminal, comprising:
    recording number of times of fail connections between the terminal and a secondary cell group (SCG); and
    in response to the number of times being greater than a preset disabling threshold, controlling the terminal to disable a dual connection mode based on a power consumption adjustment policy;
    wherein the terminal is configured to communicate with a first base station and a second base station in the dual connection mode; the second base station is an auxiliary base station, and the SCG is a group of serving cells associated with the auxiliary base station; and
    wherein controlling the terminal to disable the dual connection mode based on the power consumption adjustment policy comprises:
        receiving a measurement request sent from the first base station, wherein the measurement request is configured to indicate the terminal to measure the second base station; and
        not responding the measurement request.

2. The method according to claim 1, wherein recording the number of times of fail connections between the terminal and the SCG comprises:
    storing the number of times of fail connections between the terminal and the SCG in response to receiving a first instruction, wherein the first instruction is configured to instruct the terminal to optimize power consumption of the terminal.

3. The method according to claim 1, wherein recording the number of times of fail connections between the terminal and the SCG comprises:
    determining that the terminal is in a screen-on state; and
    in response to the screen-on state and that the terminal fails to connect with the SCG once, storing the number of times of fail connections between the terminal and the SCG within a preset time period.

4. The method according to claim 1, wherein the method further comprises:
    in response to the number of times being less than or equal to a preset enabling threshold, controlling the terminal to enable the dual connection mode based on the power consumption adjustment policy.

5. An apparatus for controlling power consumption of a terminal, comprising a memory, a processor, and a computer program stored in the memory and being executable in the processor; wherein the processor, when executing the program, implements operations comprising:
- recording number of times of fail connections between the terminal and a secondary cell group (SCG); and
- in response to the number of times being greater than a preset disabling threshold, controlling the terminal to disable a dual connection mode based on a power consumption adjustment policy;
- wherein the terminal is configured to communicate with a first base station and a second base station in the dual connection mode; the second base station is an auxiliary base station, and the SCG is a group of serving cells associated with the auxiliary base station; and
- wherein controlling the terminal to disable the dual connection mode based on the power consumption adjustment policy comprises:
  - receiving a measurement request sent from the first base station, wherein the measurement request is configured to indicate the terminal to measure the second base station; and
  - not responding the measurement request.

6. The apparatus according to claim 5, wherein recording the number of times of fail connections between the terminal and the SCG comprises:
- storing the number of times of fail connections between the terminal and the SCG in response to receiving a first instruction, wherein the first instruction is configured to instruct the terminal to optimize power consumption of the terminal.

7. The apparatus according to claim 5, wherein recording the number of times of fail connections between the terminal and the SCG comprises:
- determining that the terminal is in a screen-on state; and
- in response to the screen-on state and that the terminal fails to connect with the SCG once, storing the number of times of fail connections between the terminal and the SCG within a preset time period.

8. The apparatus according to claim 5, wherein the operations further comprise:
- in response to the number of times being less than or equal to a preset enabling threshold, controlling the terminal to enable the dual connection mode based on the power consumption adjustment policy.

9. A non-transitory computer storage medium, which stores computer instructions, wherein the instructions, when being executed by a processor, implements operations comprising:
- recording number of times of fail connections between a terminal and a second cell group (SCG); and
- in response to the number of times being greater than a preset disabling threshold, controlling the terminal to disable a dual connection mode based on a power consumption adjustment policy;
- wherein the terminal is configured to communicate with a first base station and a second base station in the dual connection mode; the second base station is an auxiliary base station, and the SCG is a group of serving cells associated with the auxiliary base station;
- wherein controlling the terminal to disable the dual connection mode based on the power consumption adjustment policy comprises:
  - receiving a measurement request sent from the first base station, wherein the measurement request is configured to indicate the terminal to measure the second base station; and
  - not responding the measurement request.

10. The non-transitory computer storage medium according to claim 9, wherein recording the number of times of fail connections between the terminal and the SCG comprises:
- storing the number of times of fail connections between the terminal and the SCG in response to receiving a first instruction, wherein the first instruction is configured to instruct the terminal to optimize power consumption of the terminal.

11. The non-transitory computer storage medium according to claim 9, wherein recording the number of times of fail connections between the terminal and the SCG comprises:
- determining that the terminal is in a screen-on state; and
- in response to the screen-on state and that the terminal fails to connect with the SCG once, storing the number of times of fail connections between the terminal and the SCG within a preset time period.

* * * * *